United States Patent [19]

Derighetti

[11] Patent Number: 5,506,382
[45] Date of Patent: Apr. 9, 1996

[54] APPARATUS FOR AND METHOD OF ELECTRO-EROSIVE CUTTING WITH FLATTENED AND ROTATABLE WIRE CATHODE

[75] Inventor: Rene Derighetti, Losone, Switzerland

[73] Assignee: AG Fur Industrielle Elektronik, Losone Bei Locarno, Switzerland

[21] Appl. No.: 111,085

[22] Filed: Aug. 24, 1993

[30] Foreign Application Priority Data

Aug. 26, 1992 [DE] Germany .................. 42 28 328.0

[51] Int. Cl.$^6$ .................................... B23H 7/10
[52] U.S. Cl. ........................................ 219/69.12
[58] Field of Search ................ 219/69.12, 69.17, 219/69.13

[56] References Cited

U.S. PATENT DOCUMENTS

| | | | |
|---|---|---|---|
| 4,123,645 | 10/1978 | Shichida et al. | 219/69.12 |
| 4,232,208 | 11/1980 | Buhler | 219/69.12 |
| 4,363,948 | 12/1982 | Itoh | 219/69.12 |
| 4,418,263 | 11/1983 | Inoue | 219/69.12 |
| 4,448,655 | 5/1984 | Inoue | 219/69.12 |
| 4,607,149 | 8/1986 | Inoue | 219/69.12 |
| 4,766,280 | 8/1988 | Groos | 219/69.12 |

FOREIGN PATENT DOCUMENTS

| | | | |
|---|---|---|---|
| 2477452 | 9/1981 | France . | |
| 56-152532 | 11/1981 | Japan | 219/69.12 |
| 62-028122 | 2/1987 | Japan . | |
| 62-157726 | 7/1987 | Japan | 219/69.12 |
| 01222823 | 9/1989 | Japan . | |
| 01234118 | 9/1989 | Japan . | |
| 01205926 | 11/1989 | Japan . | |
| 3-234424 | 10/1991 | Japan . | |
| 3-234419 | 10/1991 | Japan . | |
| 663370 | 12/1987 | Switzerland . | |
| 837709 | 6/1981 | U.S.S.R. | 219/69.12 |

*Primary Examiner*—Geoffrey S. Evans
*Attorney, Agent, or Firm*—Cohen, Pontani, Lieberman, Pavane; Christa Hildebrand

[57] ABSTRACT

Apparatus and cathode for and method of electro-erosive cutting. The cathode is in the form of a wire, especially a round wire. The wire travels over at least two wire guides. A wire-shaping assembly cross-sectionally shapes the round wire just before it starts to cut. A wire-rotating assembly rotates the wire around the latter's longitudinal axis.

22 Claims, 12 Drawing Sheets

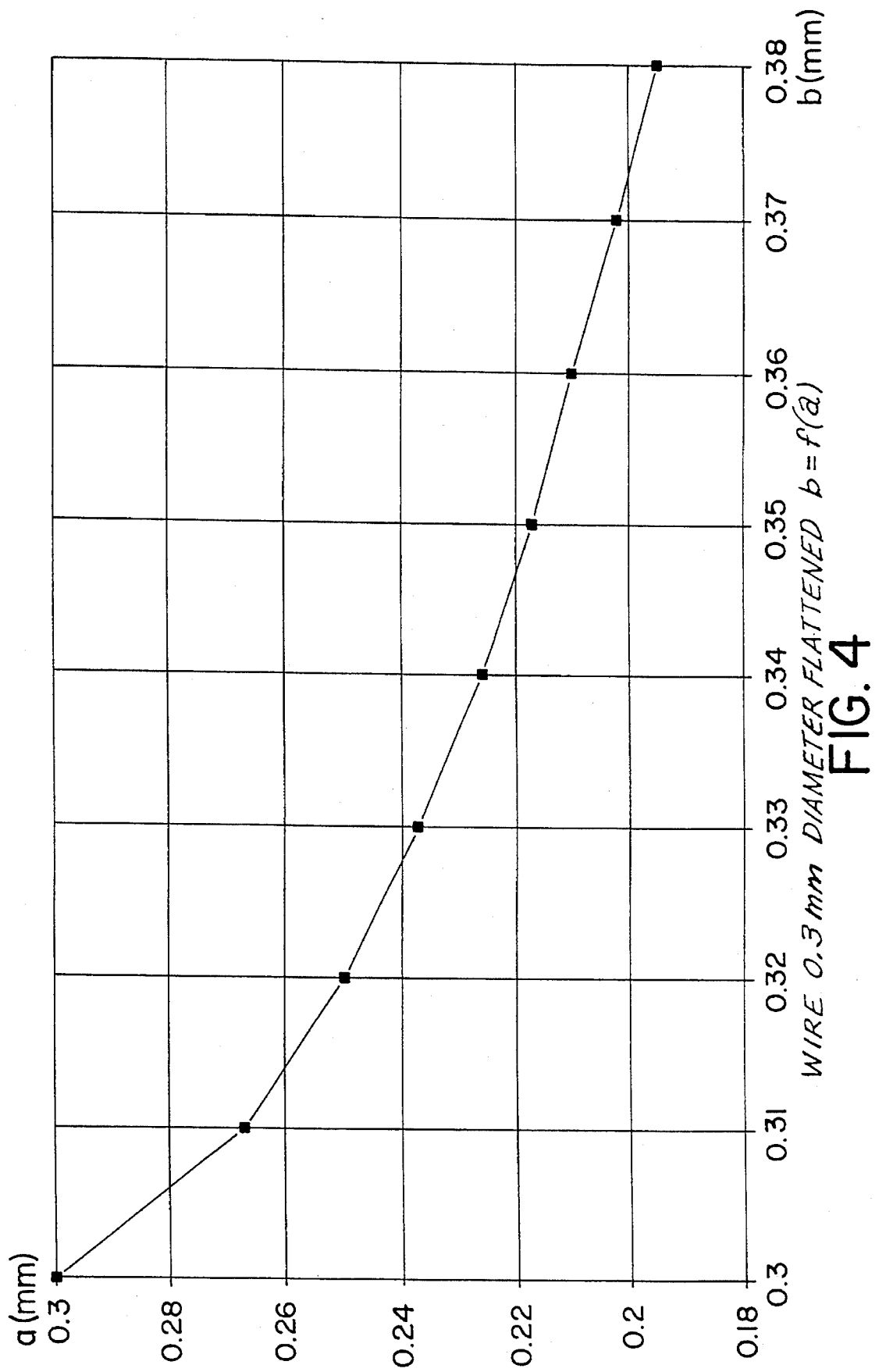

APPARATUS FOR AND METHOD OF ELECTRO-EROSIVE CUTTING WITH FLATTENED AND ROTATABLE WIRE CATHODE

BACKGROUND OF THE INVENTION

The present invention relates to an apparatus for electro-erosive cutting with a cathode in the form of a wire, especially a round wire, that travels over at least two wire guides, and, second, a cathode in the form of a wire, especially a round wire, and, third a method of electro-erosive cutting using apparatus with a cathode in the form of a wire, especially a round wire.

Many types of apparatus for and methods of electro-erosive cutting are known. The basic apparatus usually comprises a stand with transmissions and wiring, a rinsing system, a generator, and numerical or computerized numerical controls. A cathode in the form of a wire cuts a blank out of the workpiece, which constitutes the anode, starting with an already drilled bore or reference point. Only round wires have been successfully employed until now.

A major objective in contemporary efforts to improve electro-erosive cutting is to increase profits by accelerating the cutting process. Efforts are almost exclusively devoted to transmitting more current through the wire, which requires a thicker wire and a sacrifice in precision.

Japanese Exposure 62-28122 (published Feb. 6, 1987) discloses using thicker wires with cross-sections that allow sharp corners to be cut. These wires can be square, triangular, or even flat in cross-section (FIG. 3). When they are used for cutting straight ahead, the cutting need no more be decelerated to attain as narrow a cut as possible than when a very narrow wire is employed. The limitations of these wires become evident, however, when it becomes necessary to cut around curves and angles in that the width of the cut will vary with the orientation of the wire along the cut. The cut will be narrowest only when an edge of the wire is facing directly forward. This situation, however, occurs only occasionally during a typical cut, as will be evident from the Japanese publication's FIG. 3. When a 90° angle is cut with a flat wire for instance, the width of the cut will vary considerably upstream and downstream of the angle.

SUMMARY OF THE INVENTION

One object of the present invention is accordingly electro-erosive apparatus with a cathode in the form of a wire that will allow more rapid cutting than at the state of the art without sacrificing precision.

Another object is a cathode in the form of a wire, especially a round wire that will be particularly effective in apparatus in accordance with the invention.

The third and final object of the present invention is a method that will fully exploit the advantages of the apparatus and cathode in accordance with the invention.

The first object is attained in accordance with the invention in apparatus of the aforesaid genus characterized either by a wire-shaping assembly that cross-sectionally shapes the round wire just before it starts to cut or by a wire-rotating assembly that rotates the wire around the latter's longitudinal axis or by both.

The second object is attained with a round wire that is cross-sectionally shaped, just before it starts to cut, into a wire with/our outer surfaces, two essentially flat and parallel sides and two convex and rounded edges, that is, and with one diameter longer than the other. The cross-sectional shape of the wire can be instantly varied in accordance with the varying geometry of the cut. If an already shaped wire is employed of course, a wire-shaping assembly in the apparatus itself will not be necessary although the advantage of instantly varying the shape of the wire in accordance with the geometry of the cut will be lost.

The third object is attained in accordance with the invention in a method whereby either the round wire is cross-sectionally shaped by one assembly just before cutting or is rotated around its own longitudinal axis in accordance with the geometry of the cut while it is cutting out a blank by another assembly comprising two rotating wire guides, or both.

The wire-shaping assembly in the apparatus in accordance with the invention provides an extremely convenient means of flattening a round wire. A flat wire will cut more rapidly, especially when one edge faces forward along the cut. The wire can be conveniently oriented by the wire-rotating assembly and method in accordance with the invention. Although it is in principle possible to load apparatus in accordance with the invention with an already shaped wire, the combination of wire-shaping assembly and wire-rotating assembly in accordance with the invention provides a particularly rich potential.

DESCRIPTION OF THE PREFERRED EMBODIMENTS

The wire-shaping assembly in one particularly preferred embodiment of the invention comprises a pair of flattening rollers with a variable nip that the wire travels through. Such an assembly is simple and easy to integrate into the overall apparatus. The variable nip is a convenient means of instantly varying the shape of the wire in accordance with the instant geometry of the cut.

The wire-shaping assembly in another preferred embodiment of the invention rotates around the longitudinal axis of the wire. Such an assembly can rotate along with the wire-rotating assembly. The wire will accordingly always have the same orientation as the wire-rotating assembly and will not have to be separately oriented. One particularly convenient means of ensuring this advantage is to couple the wire-shaping assembly to the wire-rotating assembly. The two assemblies will accordingly always be synchronized.

The wire-rotating assembly in one especially preferred embodiment of the invention comprises two rotating wire guides. The potential of such a design will be particularly great when for example an upper and a lower wire guide can be synchronously rotated correctly in relation to the cut in response to a command. The wire's orientation can accordingly be continuously prescribed. It is of course conceivable for the rotations of the two wire guides not to be synchronized for some types of cutting. If the blank is simple enough, all that is necessary is to keep the edge of the wire facing forward along the cut. Even complicated blanks with conical-surface edges can then be cut out.

In another preferred embodiment of the invention each wire-rotating assembly has its own motor and transmission, and the motors are controlled by computerized controls, especially by way of a decoder. Such motors and transmissions render the wire-rotating assembly and, if one is coupled to it, the wire-shaping assembly fully automated. One particularly practical approach to automation is for the computerized controls to operate the motors by way of the decoder. The decoder ensures uncomplicated integration of both the wire-rotating assembly and the wire-shaping assembly into the computerized numerical controls or into the apparatus' computer.

Another embodiment of the invention features a more powerful generator. "More powerful" is to be understood in relation to conventional apparatus and reflects the fact that a flat wire will transmit more current than a round wire will, so that a blank can be cut out much more rapidly.

One particularly preferred embodiment of the invention is characterized by a component that is connected to the computerized controls and varies the pulse parameters or rinse parameters or both and especially the current parameters in accordance with a prescribed cut width. This approach provides a particularly rich potential for monitoring and varying the width of the cut.

Still another especially preferred embodiment, finally, includes a wire-position sensor. A wire-position sensor is manufactured by AGIE (Aktiengesellschaft für Industrielle Elektronik) for example and is accordingly known. This sensor even further optimizes the potential of the present invention, especially with regard to precision.

In one especially preferred embodiment of the method in accordance with the invention the wire-shaping assembly cross-sectionally shapes the round wire into a wire with four outer surfaces, specifically two essentially flat and parallel sides and two convex and rounded edges, with one diameter longer than the other. Rolling a round wire into such a shape is an especially convenient way of exploiting an interesting discovery, that the rolling at least initially decreases the thickness (defined as the dimension at a right angle to the roller axes) of the wire more rapidly than it increases its width.

In another especially preferred embodiment of the method in accordance with the invention the thickness of the edge of the wire that faces forward along the cut is instantly varied as the geometry of the cut varies. This can be conveniently accomplished by varying the nip between the rollers as heretofore described. It is particularly convenient to vary the ratio between the side and the edge of the wire in accordance with the speed and radius of curvature of the cut. The width of the edge of the wire that faces forward along the cut and hence the width of the cut itself can accordingly be optimized.

In another especially preferred embodiment of the method in accordance with the invention the cross-sectionally shaped wire is essentially continuously rotated as it cuts so that its forward edge always faces directly forward along the cut. This feature particularly accelerates the cutting.

In another especially preferred embodiment of the method in accordance with the invention the cross-sectionally shaped wire is at least sometimes rotated with its side at least partly facing forward along the cut in order to execute a follow-up stroke, at an interior corner for example. Even angles with a particularly short radius can be conveniently cut out with a follow-up stroke.

In another especially preferred embodiment of the method in accordance with the invention the cross-sectionally shaped wire essentially cuts an exterior corner, especially with a follow-up stroke, by cutting beyond the vertex of the angle, rotating around its longitudinal axis outside the corner, and cutting forward along the other side. It is accordingly particularly easy to cut sharp exterior corners, especially by using a follow-up stroke. In another especially preferred embodiment of the method in accordance with the invention the cross-sectionally shaped wire cuts an interior corner, especially with a follow-up stroke, by cutting up to the vertex of the angle, rotating around its longitudinal axis inside the angle, and cutting forward along the other side.

In another especially preferred embodiment of the method in accordance with the invention the pulse parameters or rinse parameters or both and especially the current parameters are varied in accordance with a prescribed cutting curve. It turns out to be particularly convenient to be able to reduce the current when cutting out arcs of a circle, especially with a short radius, in order to maintain the width of the cut constant. In principle a cut will widen slightly to halfway around the corner when a curve is cut around a particular angle at constant parameters and then narrow again due the "outward skid" of the flat wire. The aforesaid strategies in accordance with the invention will eliminate this problem.

In another especially preferred embodiment of the method in accordance with the invention parameters for reducing the current in accordance with the radius of the curve being cut can be obtained by calculating geometric errors in the computer. This considerably simplifies the overall procedure. It is in this event particularly convenient to store the parameters ahead of time in the computer in accordance with the radius of the curve being cut. The parameters need to be calculated only once, so that no time needs to be taken up for computing while the blank is being cut out. The operator does not need to be concerned in such calculations at all. Instant wire-shaping apparatus constructed in accordance with the present invention will be much easier to operate than conventional wire-wire apparatus. Basically, instant wire-shaping apparatus is so practical that it can be employed even without further development for almost any job, finishing it much more rapidly than any conventional apparatus.

Further preferred embodiments and practical advanced versions of the invention will be evident from the following specification and accompanying drawing, which also illustrates differences between the invention and the prior art.

BRIEF DESCRIPTION OF THE DRAWINGS

The invention will now be specified with reference to the drawing, wherein

FIG. 4 is a graph allowing comparison of wires cross-sectionally shaped to various extends.

DESCRIPTION OF THE DRAWINGS

The terminology employed hereinafter is intended to facilitate comprehension of the present invention without limiting it in any way. The terms "top," "bottom," "narrower," and "wider" in particular are to be understood as referring to apparatus of conventional orientation and size and to conventionally mounted workpiece.

Figure 1:
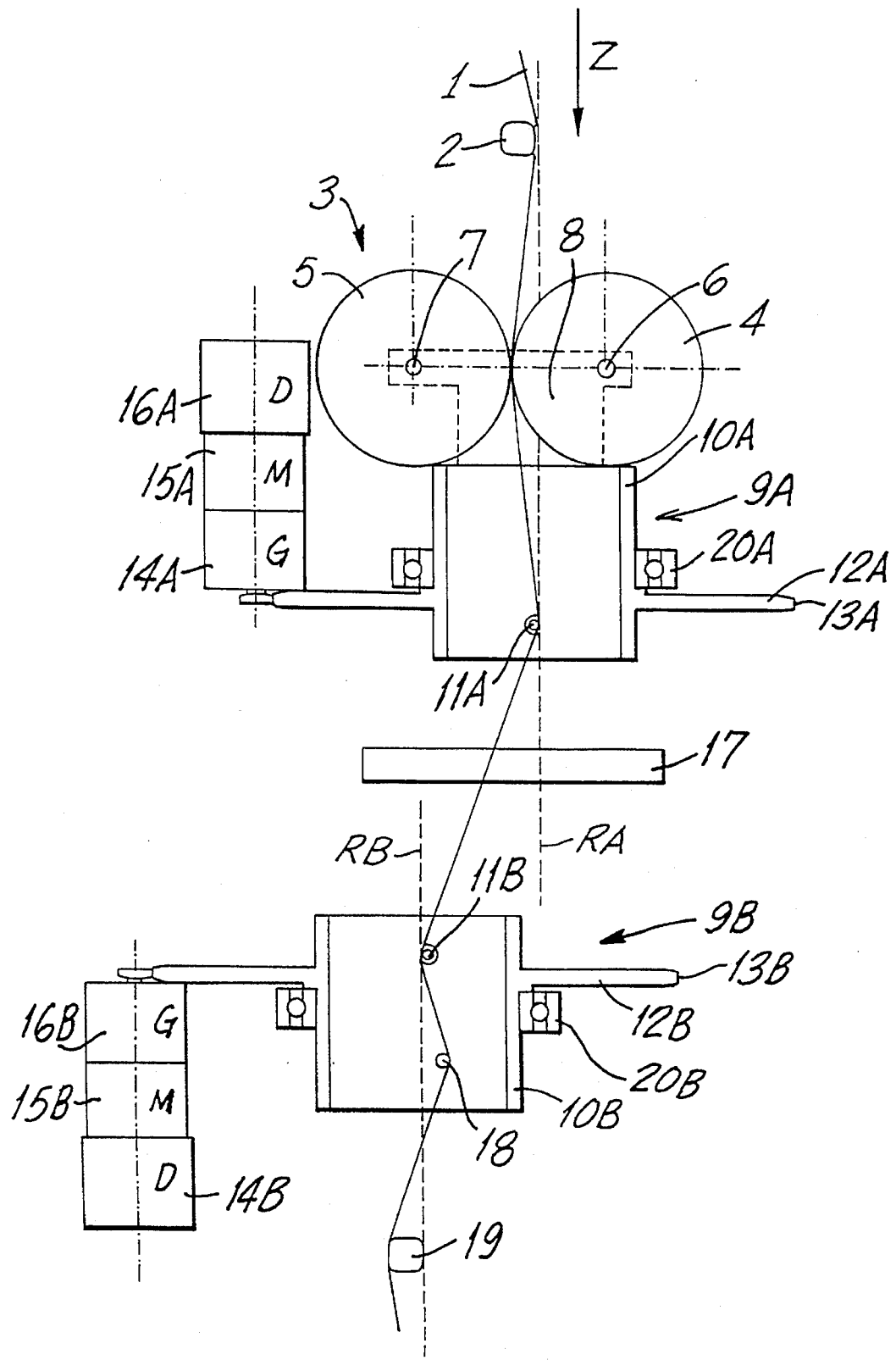
FIG. 1 is a schematic view of various components of apparatus in accordance with the invention for electro-erosive cutting.

FIG. 1 illustrates components in accordance with the invention of apparatus for electro-erosive cutting in accordance with the invention, which can also be called instant-shaped wire apparatus. Basic elements like the stand with its transmissions and wiring, rinsing system, generator, and computerized numerical controls are considered to be inthemselves known and are accordingly not specified. A cathode in the form of a round wire 1 is unrolled and advanced through the apparatus in the direction indicated by arrow Z, usually from top to bottom, by an unillustrated wire advance. A source 2 of electric current conventionally supplies pulses from an unillustrated generator. A wire-shaping assembly 3 cross-sectionally shapes, flattens in the present case, the incoming round wire 1. Wire-shaping assembly 3 comprises two wire-flattening rollers 4 and 5. The nip between the two rollers can be varied, by an unillustrated fine-thread screw for example. The screw can be driven by a motor. This feature makes it possible to flatten wire 1 to various extends in accordance with the size of the nip between rollers 4 and 5.

Each wire-flattening roller 4 and 5 rotates around a shaft 6 and 7 respectively on an arm 8 (hidden and accordingly represented by broken lines in FIG. 1) fastened to a wire-rotating assembly 9A. Wire-rotating assembly 9A includes a wire-guide head 10A in the form of a hollow cylinder. Round wire 1 travels over a wire guide 11A accommodated in wire-guide head 10A.

Wire-guide head 10A is surrounded by an annular flange 12A with cogs 13A along its circumference. Cogs 13A are engaged by a transmission 14A. Transmission 14A is driven by a motor 15A. Motor 15A is controlled and regulated by a decoder 16A. The motor can be a stepper or, if appropriate circuitry is provided, a direct-current motor. Decoder 16A is connected to the apparatus' unillustrated computerized controls.

FIG. 1 also illustrates another and similar wire-rotating assembly 9B wherein wire 1 travels over a wire guide 11B accommodated in a wire-guide head 10B surrounded by an annular flange 12B with cogs 13B engaged by a transmission 14B driven by a motor 15B controlled and regulated by a decoder 16B connected to the apparatus' unillustrated computerized controls.

A blank is cut out of workpiece 17 positioned between wire-rotating assemblies 9A and 9B.

First wire-rotating assembly 9A rotates around an axis RA and second wire-rotating assembly 9B around an axis RB. Axes RA and RB are represented by discontinuous lines. Wire-shaping assembly 3 is positioned on first wire-rotating assembly 9A with its nip slightly to one side of axis RA. Wire 1 is accordingly forced taught against source 2 of electric current and wire guide 11A in wire-guide head 10A. Wire 1 is similarly forced taught against another source 19 of electric current and against another wire guide 11B by a tensioning mechanism 18.

The orientation of wire-rotating assemblies 9A and 9B in itself, the position of axes RA and RB of rotation, that is, can be controlled by a known procedure by way of arms 20A and 20B fastened to wire-guide heads 10A and 10B. It has, however, surprisingly been discovered that wire guides 11A and 11B can also be rotated to advantage around axes RA and RB, preferably synchronously. This operation will at first seem ridiculous to one of skill in the art in that it makes no sense to rotate a round wire around its longitudinal axis. To rotate a round wire that has been shaped and flattened by an upstream assembly (or even a wire that is supplied flattened, although such a material is not as widely applicable) does make sense, however. The angle that a flattened wire is rotated around, in fact, dictates the width of the cut produced by that wire.

The result is a completely new electro-erosive cutting technology. It becomes possible for the first time to cut effectively with a wire in the form of a strip or band. The components needed to make such an approach possible on the other hand are not at all expensive in view of their results.

Figure 2:
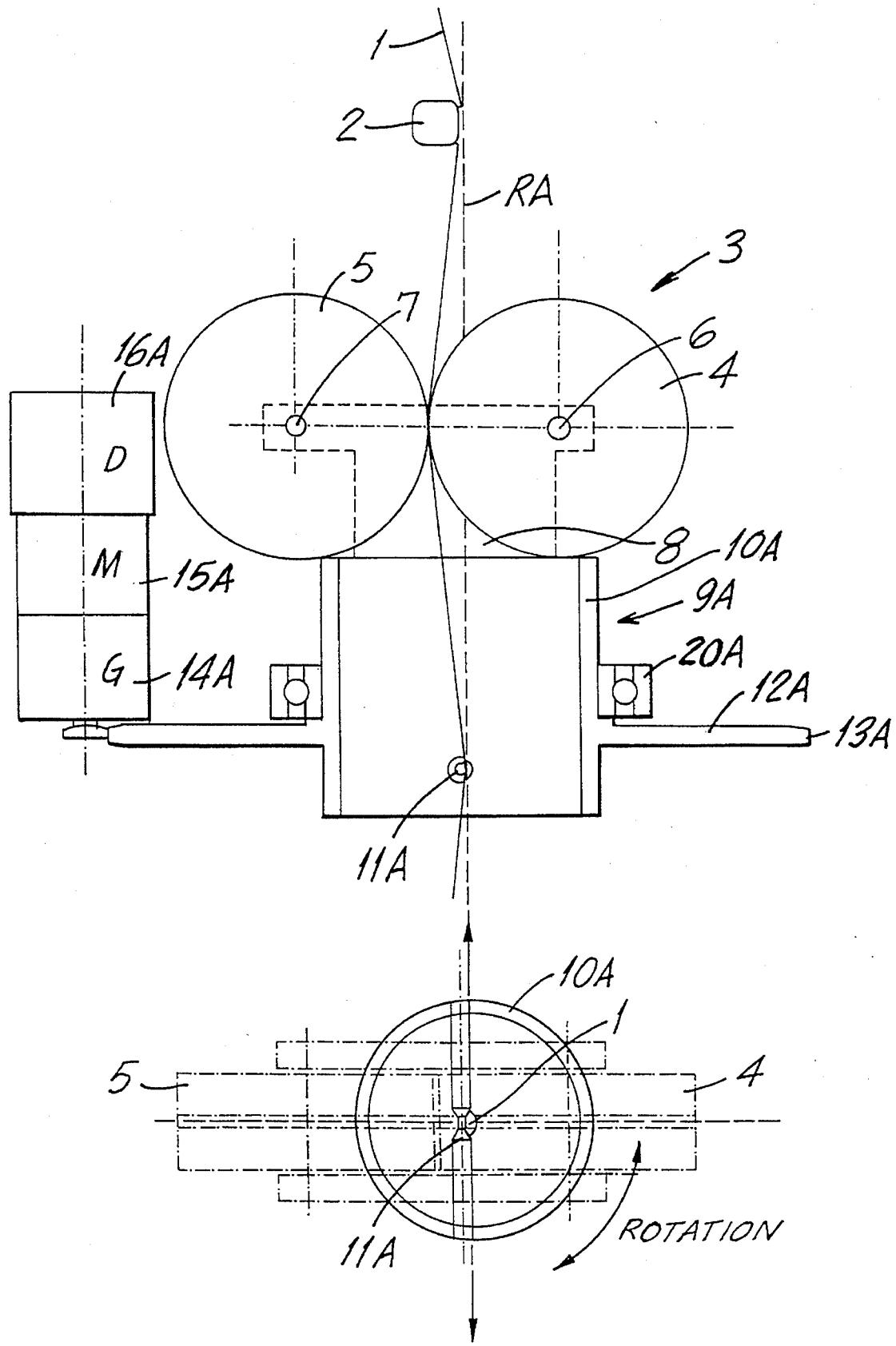
FIG. 2 is another schematic view of various components of apparatus in accordance with the invention for electro-erosive cutting.

The top of FIG. 2 is a larger-scale view of part of the system illustrated in FIG. 1. The bottom of FIG. 2 is a highly schematic top view of the components at the top, evidently illustrating the position of the wire in aligning mechanism 11A. The arrow represents rotation around the axis of the wire in wire guide 11A in wire-guide head 11A.

Figure 3A:
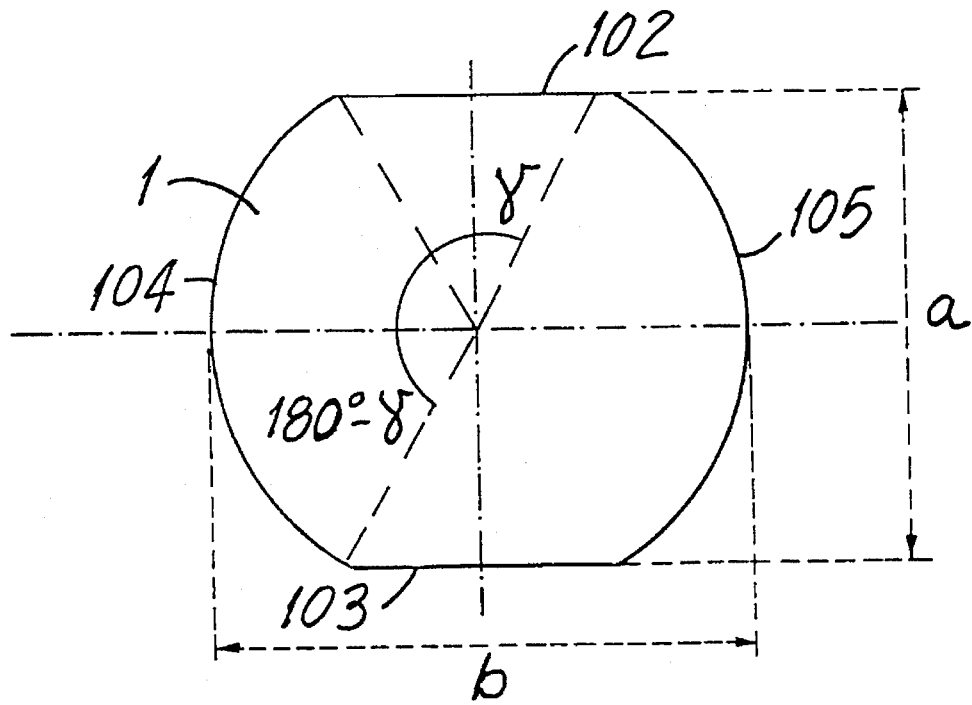
FIG. 3a is a cross-section through a wire in accordance with the invention, FIG. 3b consists of cross-sections for comparison through wires cross-sectionally shaped to various extends.

FIG. 3a is a cross-section through a flattened wire 1. Originally uniformly round, it now has four outer surfaces, two essentially straight and parallel sides 102 and 103 and two convex and rounded edges 104 and 105. Sides 102 and 103 are essentially wider than edges 104 and 105. The actual cross-section is characterized by one diameter a extending from one side to the other and paralleling the edges and another diameter b extending from one edge to the other and paralleling the side.

The particular advantages of the present invention derive to a certain extent from a specific awareness. Rolling a round wire with a radius r and a diameter $d=2r$ will produce a flat wire with sides 102 and 103 a apart and edges 104 and 105 b apart, meaning that the wire is $x=d-a$ flatter. Since the total area of the cross-section remains essentially constant, the wire will be $y=b-d$ wider. It does not follow, however, that the extent y that the wire becomes wider will always equal the extent x it becomes flatter.

Figure 3B:
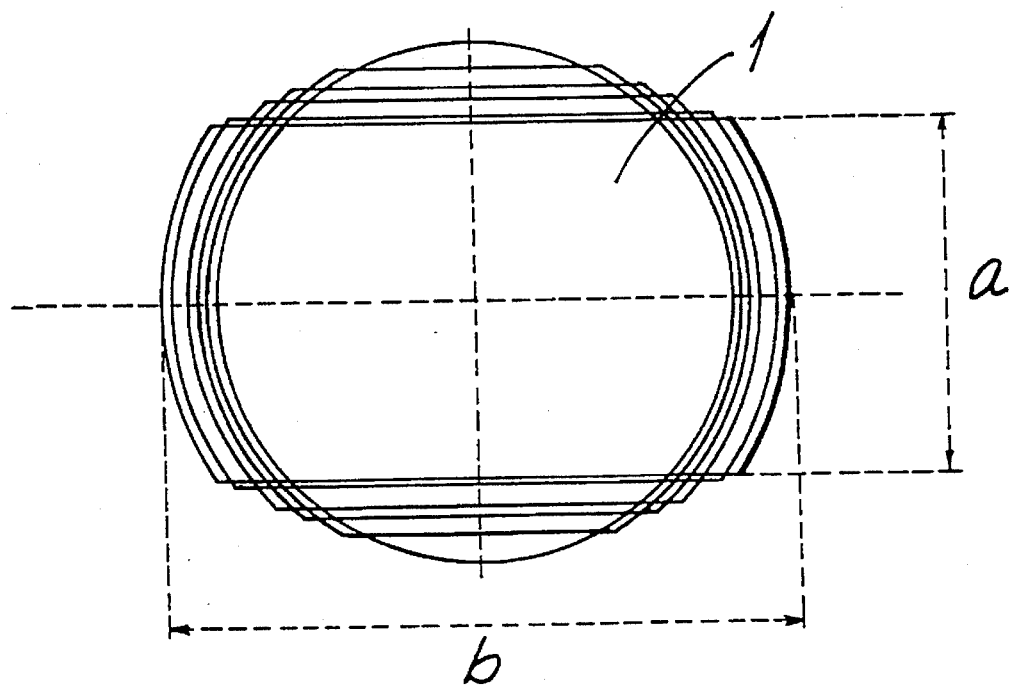

This situation will be particularly evident from FIG. 3b. It is accordingly possible to narrow the cut just by rolling the wire slightly flat without allowing it to noticeably expand in direction b.

FIG. 4 is a graph that empirically illustrates the theory very evidently. The wire is initially uniformly round and has a diameter of 0.3 mm. When the wire is rolled approximately $x=0.017$ flatter, it will become only approximately 0.01 mm wider. As the wire is flattened farther, the situation will gradually reverse. The test results accordingly correspond pretty well with the theoretical calculations. If such results are entered as a matrix in a computer that controls an electro-erosive cutting apparatus it will be possible to include a completely new factor in the process, the ability to instantly vary the shape of the wire as necessary. It is of course also possible to adjust the wire-shaping assembly to a constant value, although variability makes the method much more practical.

Figure 5A:
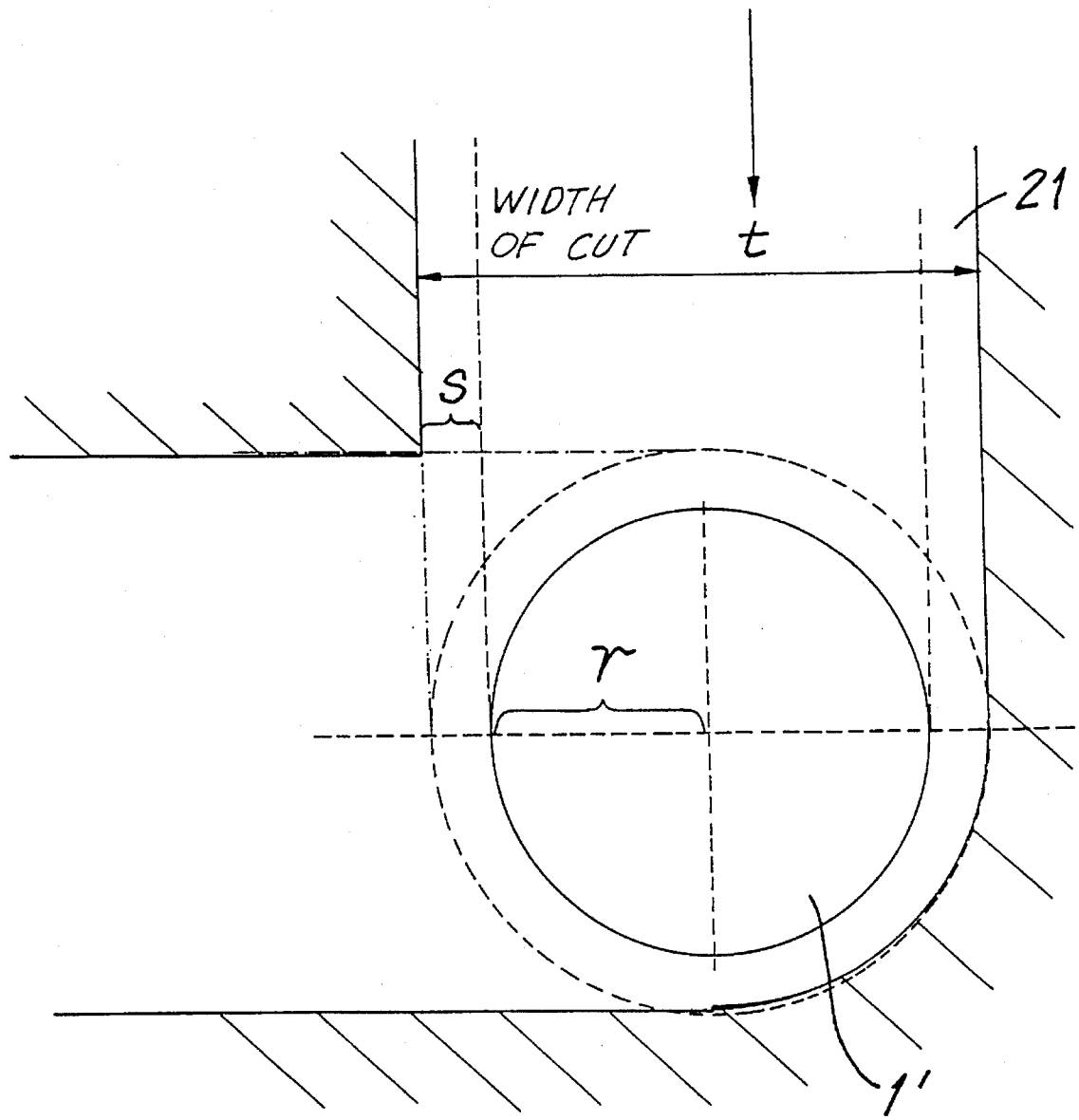
FIG. 5a is a top view of a cut made with a conventional wire and by the conventional method of electro-erosive cutting.
Figure 5B:
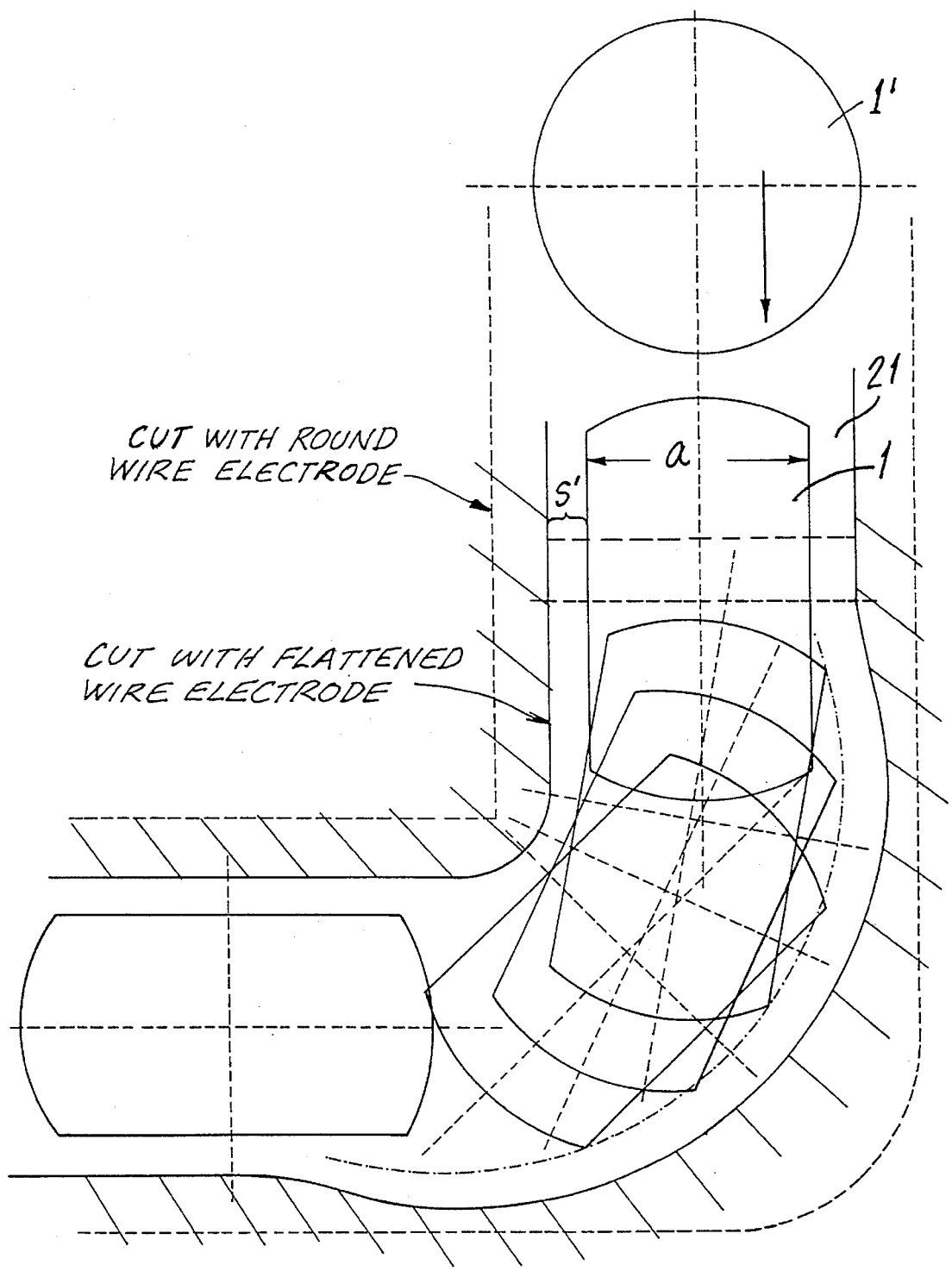
FIG. 5b is a top view of a cut made with a wire and by the method of electro-erosive cutting in accordance with the invention.

Various preferred cutting techniques will now be specified. FIG. 5a illustrates how a 90° angle is cut with a conventional uniformly round cathode wire 1'. The arrow represents the cutting direction. The resulting cut 21 is $t=2r+2s$. The situation illustrated in FIG. 5A is illustrated again with broken lines in FIG. 5B along with a cut with a flattened wire. The electric parameters and cross-sectional areas of both wires are identical. FIG. 5B accordingly makes it possible to compare the cut made by a conventional uniformly round wire 1' with a cut made by a wire shaped in accordance with the invention. The width $t'=a+2s'$ is definitely less than the width t of the unshaped wire.

Wire-rotating assemblies 9A and 9B constantly maintain wire 1, which may rest against matching flat surfaces of wire guides 11A and 11B, at the correct cutting angle with one of its edges 104 and 105 forward along the cut. Since the cross-sectional area of the wire varies hardly at all when the wire is flattened, cutting can be noticeably accelerated. This is because the cut is narrower even though the cross-sectional area of the wire remains constant, because the heat-losing surface of the wire increases along with its thermal and electric strength, and because the heat resistance of the wire will decrease with its thickness.

Still another advantage is that since the wire is always edge forward, its bending moment will be higher along the cut. The greater rigidity and the lower area facing forward will considerably prevent the wire from bending subject to the pressure of removing material, which will make the cut even more precise.

The width of the cut will vary only slightly even at a corner, as will be evident from FIG. 5B. The cut will be at its widest when the wire is rotated approximately 45° and more or less the same for a 90° angle whether the wire is round or flat. It is accordingly easy when employing the flattened wire to maintain a cut that is no wider than what would be produced with a round wire of the same cross-sectional area. Although the corner is apparently not as precise as a corner cut with a round wire, at least with just one stroke, this "width-of-cut variation" is actually of little concern from the aspect of processing technology. Another surprising new approach in accordance with the invention to minimizing the variation, a specific new "curve-cutting tactic," will be specified hereinafter.

A minimal inside radius of 0.21 mm can be obtained with a round wire with a diameter of 0.3 mm for example. The gap between the wire and the wall of the cut will be approximately 0.06 mm. It is easy with a flat wire to obtain an inside radius of 0.36 mm for example. The width of the cut depends to some extent on the radius even when the edge of the shaped wire always faces forward. The situation is at all noticeable only with very short radiuses and makes no difference in point-by-point cutting.

Figure 6:
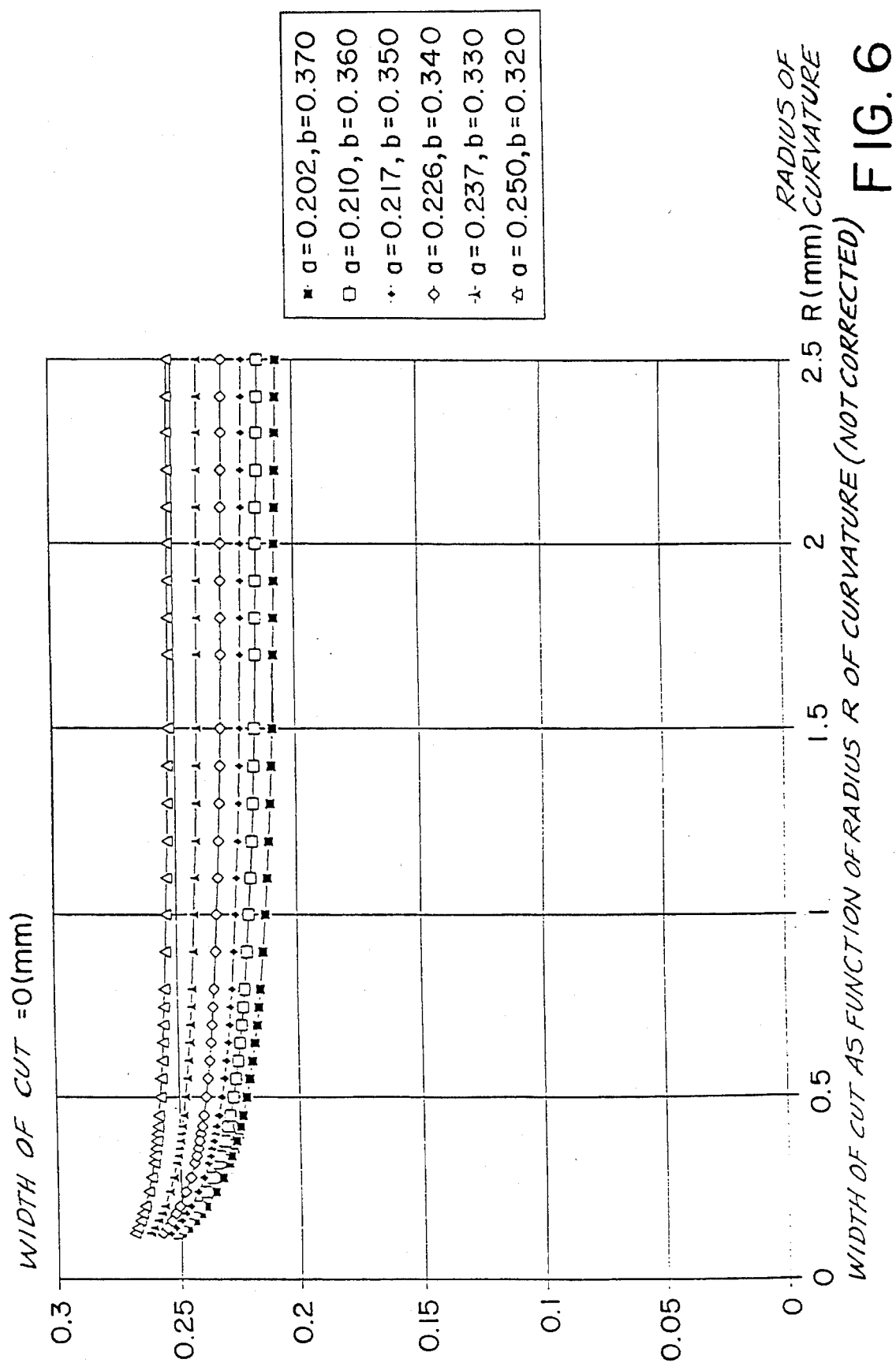
FIG. 6 is a graph illustrating by way of various cross-sectionally shaped wires width of cut in accordance with radius of curvature.

FIG. 6 illustrates width of cut as a function of the radius R of curvature of an angle or curve for various parameters and for wires shaped to various side-to-side diameters a. A constant value of $a+\approx 0.01$ mm will be evident from this graph and that detectable deviations will occur only when the radius is very short.

Figure 7:
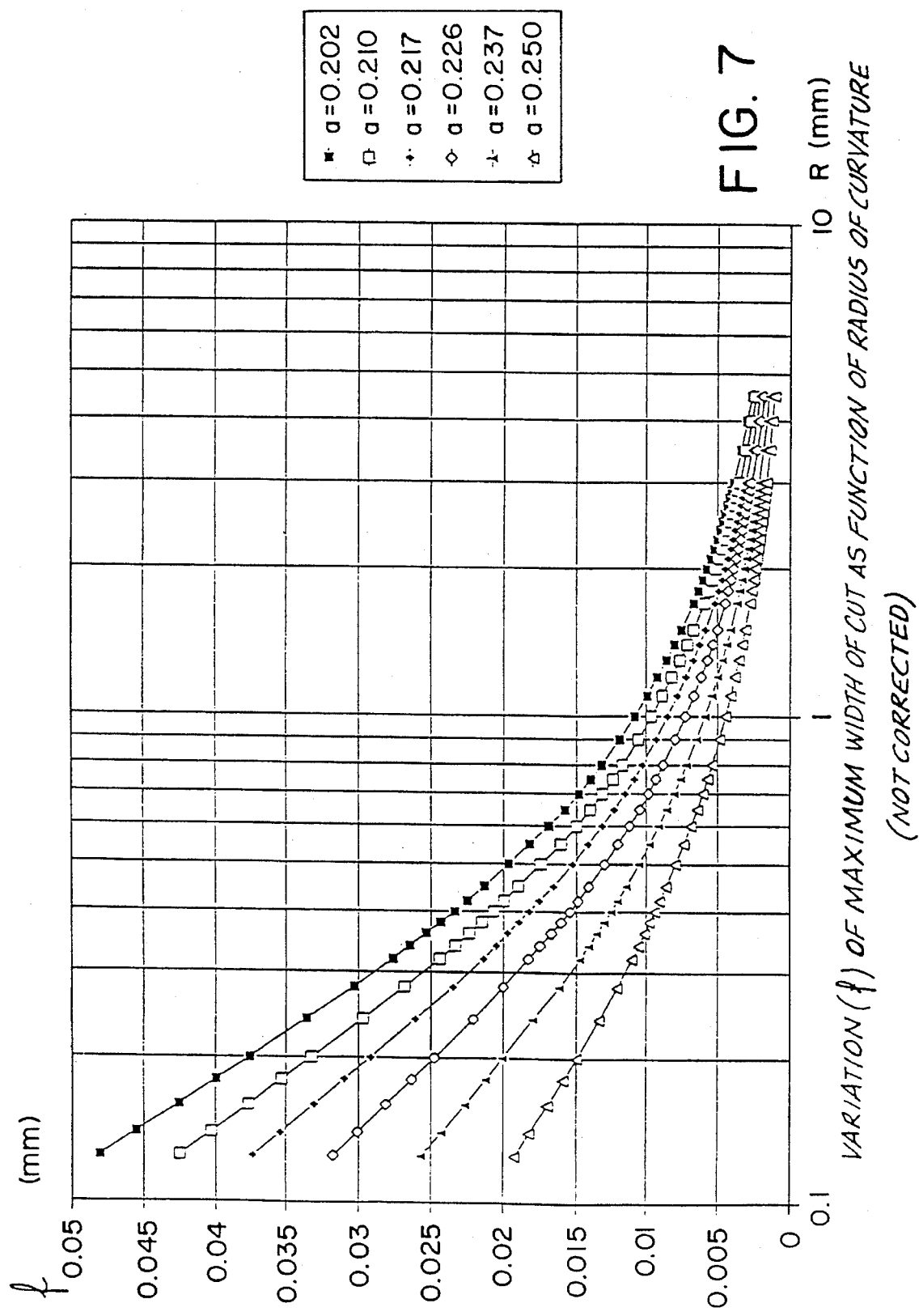
FIG. 7 is a graph illustrating by way of various cross-sectionally shaped wires difference in cut Width in accordance with radius of curvature.

FIG. 7 is an extremely out-of-scale graph illustrating the variation in the width of the gap resulting from wires rolled to various extends in relation to radius R of curvature. The variations are evidently basically slight and rapidly approach zero.

Figure 8:
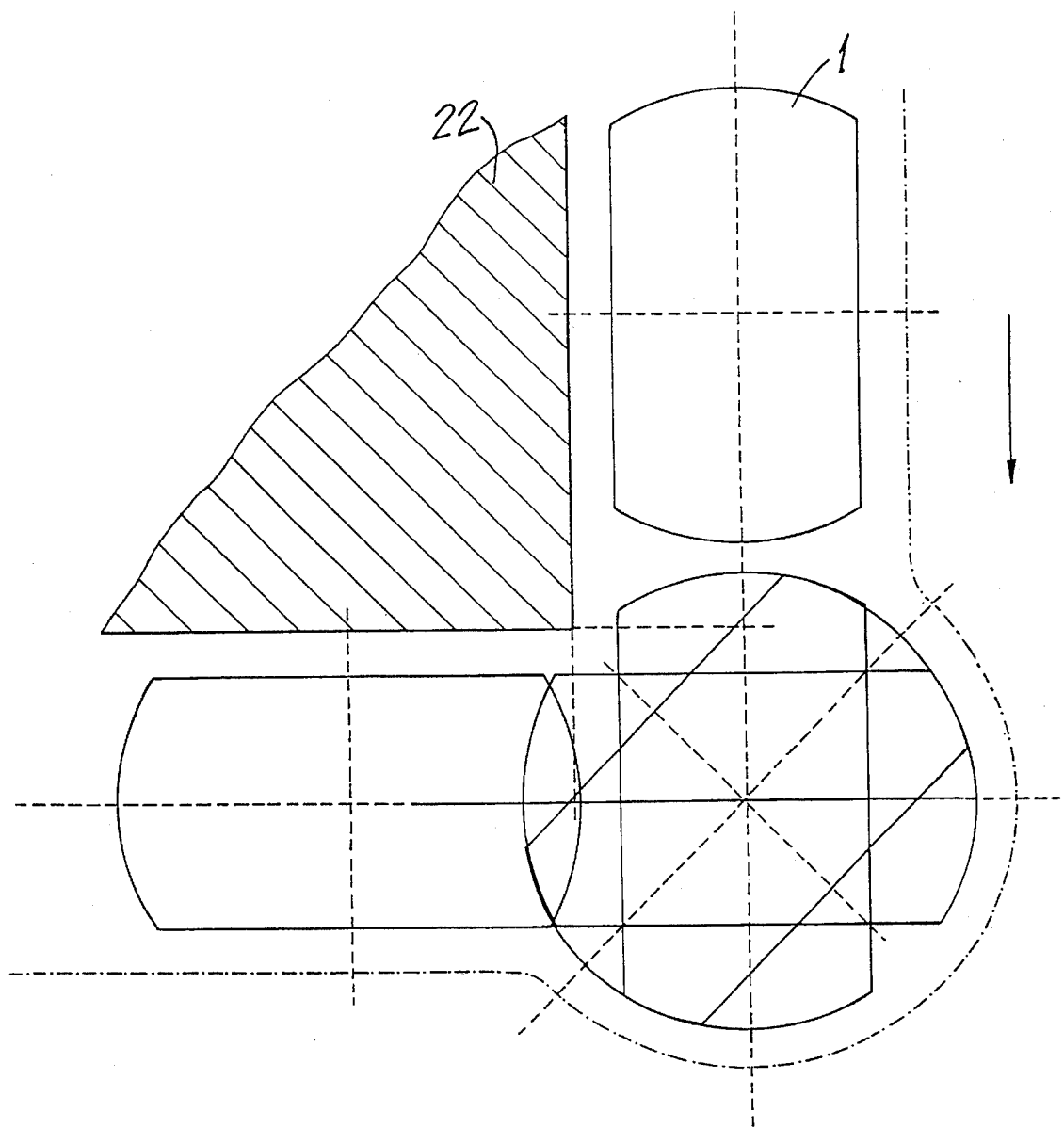
FIG. 8 is a top view illustrating cutting a sharp exterior corner with a wire and by the method of electro-erosive cutting in accordance with the invention using a follow-up stroke.

FIG. 8 illustrates cutting an exterior corner out of workpiece 22 with a shaped wire 1 by means of a follow-up stroke. The wire guides simply rotate the wire 90° around its longitudinal axis at an appropriate point and there are no problems in cutting around such a corner.

Figure 9A:
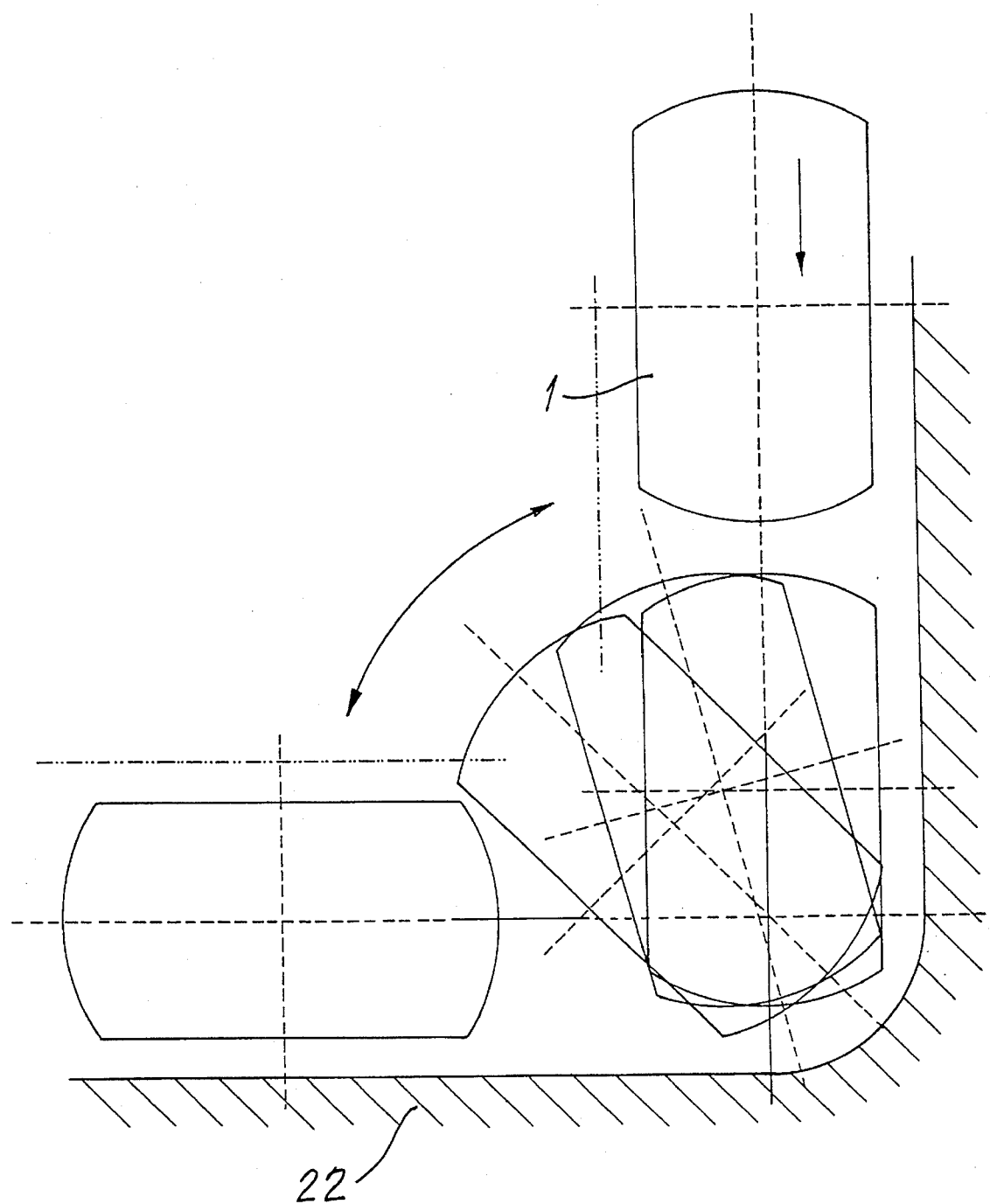
FIG. 9a is a top view illustrating one approach to cutting an interior corner with a wire and by the method of electro-erosive cutting in accordance with the invention using a follow-up stroke.
Figure 9B:
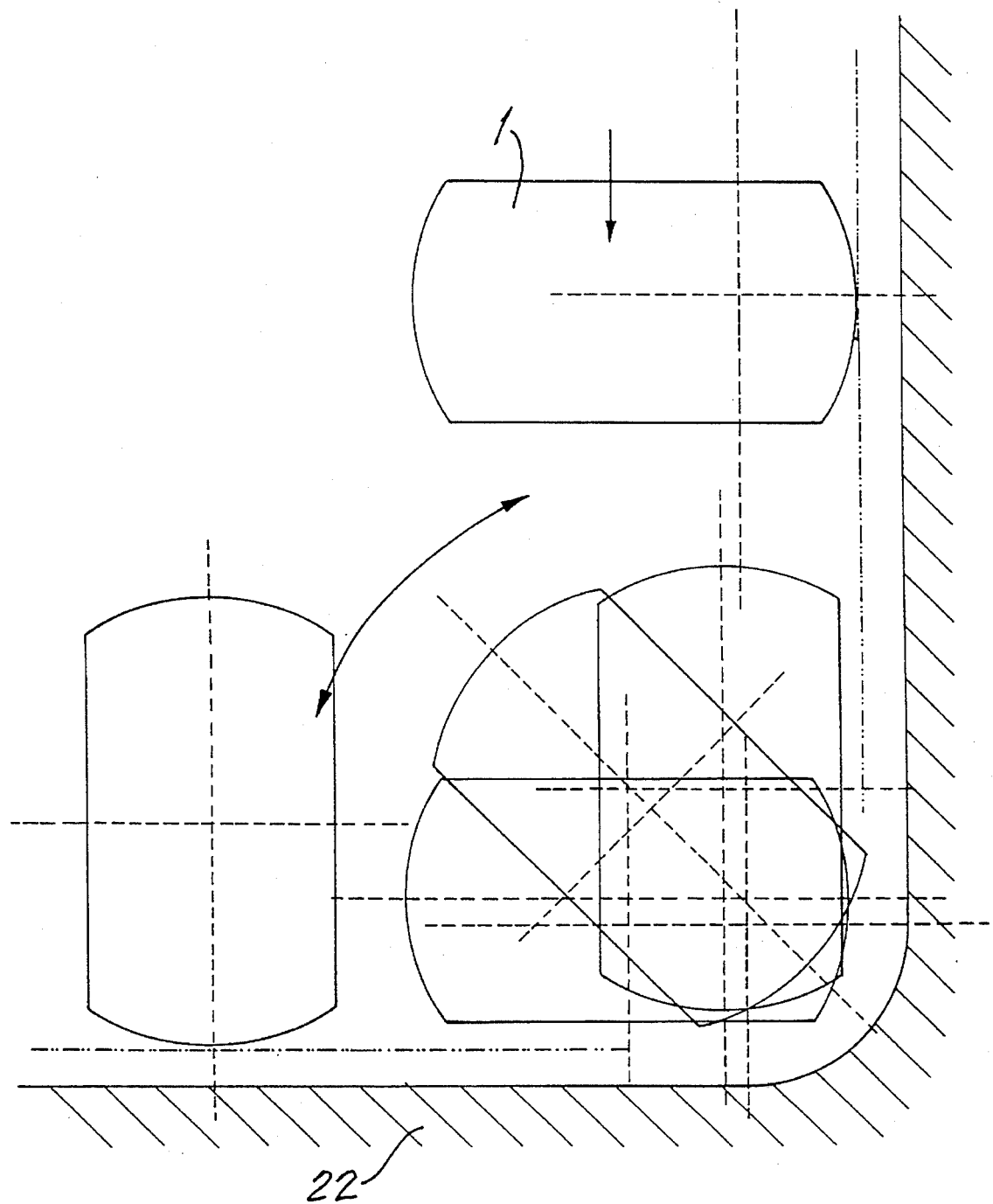
FIG. 9b is a top view illustrating another approach to cutting an interior corner with a wire and by the method of electro-erosive cutting in accordance with the invention using a follow-up stroke.

Interior corners can be cut as illustrated in FIG. 9A with slight deviations for very short radiuses. The wire is again rotated around but now inside the corner, which is 90° in the present case. The follow-up stroke is particularly effective for an interior corner with the wire at an angle to the surface of workpiece 22. The wire initially cuts forward until it arrives at the apex of the angle, at which it rotates 90° and proceeds in the new direction (FIG. 9B).

Figure 10:
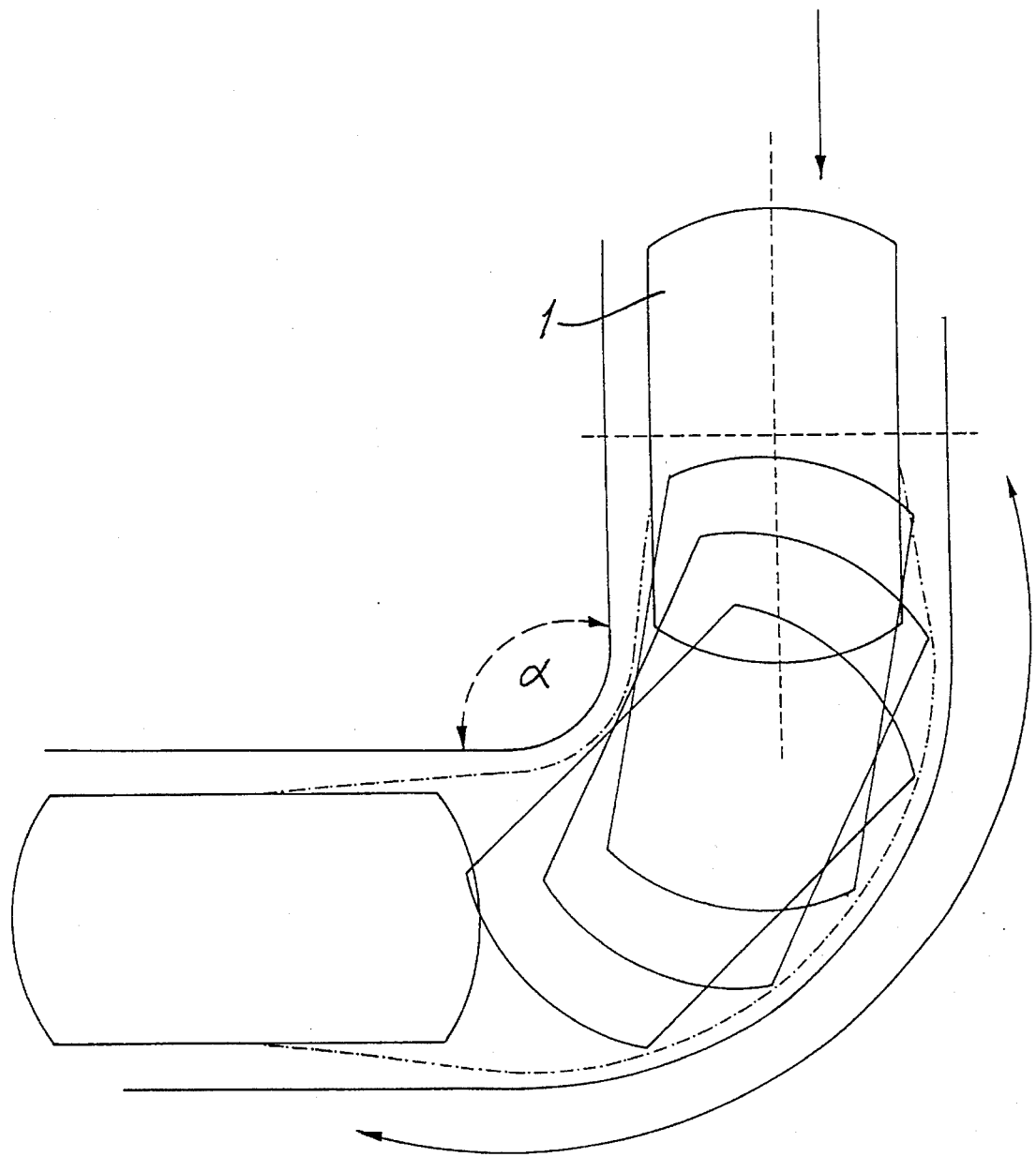
FIG. 10 is a top view illustrating how a curve is cut with a wire by the method of electro-erosive cutting in accordance with the invention.

Another advantage of the invention is constituted by an apparent contradiction. FIG. 10 illustrates an angle being navigated by a flat wire 1 (with a very short radius) without widening the gap. It is desirable in electro-erosive cutting for the cut to be as constant as possible even when roughing out contours. Another objective of the present invention is accordingly to make it possible to navigate very acute angles without widening the cut by varying the processing parameters while the cut is being cut. The terms "curve" and "angle" herein are not to be considered as limiting in any way because a cut of any geometry can be approximated by a specific combination of curves, angles, and straight lines.

This objective can be obtained by varying the pulse parameters. Varying the maximal amplitude of the current, specifically, can vary the gap by a factor of 1 to 10. The amplitude is accordingly decreased in one advanced version of the invention to facilitate cutting arcs with short radiuses. Surprisingly, the gap becomes narrower and the cut width remains constant.

The variation in the gap illustrated in FIG. 7 can accordingly be corrected by 0.035 mm. Using a wire with a diameter a of 0.230, 0.237, and 0.226 will result in total compensation.

A corresponding reduction in electric current can be determined ahead of time for every possible radius and stored as a curve-cutting tactic in the apparatus' numerical controls. The processor will convert the entries into appropriate operating parameters. It will accordingly be as easy to program for curves with a shaped wire as it is with a round wire.

An especially simple approach to obtaining the requisite corrections is to computer calculate the geometric changes in the processor and then compensate for them by a percent decrease in the pulse amplitudes employed for straight sections of the cut. The resulting parameters can be stored in the form of a matrix and automatically actuated by appropriate software.

I claim:

1. An apparatus for electro-erosive cutting of a workpiece comprising a wire electrode having a flattened, non-circular cross-section;

at least two wire guides;

means for axially driving the wire electrode through said wire guides; and a rotating assembly for rotating the wire electrode about a longitudinal wire axis.

2. An apparatus for electro-erosive cutting of a workpiece comprising:

a wire electrode guided by at least two wire guides;

a wire-shaping assembly for flattening a round wire electrode;

a rotating assembly for controllably rotating the flattened wire electrode about an axis of the wire electrode to maintain the same contour of wire-cross-sectional sector in direction along a cutting path while cutting along a curved portion of the cutting path.

3. The appararatus of claim 2, wherein the wire-shaping assembly comprises a pair of flattening rollers through which the wire electrode is guided and wherein the distance of one roller to the other rollers is variable.

4. The apparatus of claim 2, wherein the wire-shaping assembly is rotatable about the longitudinal axis of the wire electrode.

5. The apparatus of claim 4, wherein the wire-shaping assembly is coupled with the rotating assembly.

6. The apparatus of claim 2, wherein the rotating assembly comprises two rotatable wire guides.

7. The apparatus of claim 6, wherein the two rotatable wire guides have a motor drive with transmission, and the motor drive being controllable by computerized controls using a decoder.

8. The apparatus of claim 7 further comprising an assembly connected to the computerized control for varying electro-erosive current parameters, rinse parameters and pulse parameters.

9. The apparatus of claim 8, further comprising a wire-position sensor.

10. A method for electro-erosive cutting of a workpiece comprising sequentially the steps of:

axially driving the wire electrode with a circular cross section through a wire flattening assembly upstream of the workpiece;

guiding the flattened wire by two wire guides, one upstream, the other downstream of the work piece;.

controllably rotating the flattened wire electrode about an axis of the wire electrode to maintain the same contour of wire-cross-sectional sector in direction along a cutting path while cutting along a curved portion of the cutting path.

11. The method for electro-erosive cutting using a wire electrode to cut a path into a work piece according to claim 10, further comprising the steps of:

flattening a round wire immediately before the wire is entering the work piece to perform the cutting.

12. The method of claim 10, wherein the wire flattening provides a wire having a generally rectangular cross section with four sides of which two opposite sided being straight and parallel to each other, and two opposite sides being outwardly curved.

13. The method of claim 12, comprising a further step of controlling the flattening of the wire to adjust the cross section of the wire to variations in the cutting path.

14. The method of claim 12, comprising a further step of controlling the flattening of the cross section of the wire in relation to cutting speed and curvature of the path to be cut.

15. The method of claim 14, further comprising the steps of rotating the flattened wire to advance forwardly one of the curved sides of the wire through the cutting path.

16. The method of claim 14, further comprising the steps of rotating the flattened wire to advance the straight and parallel sides through the cutting path.

17. The method of claims 14, further comprising the steps of advancing the wire through a corner in the path having an angle ($\alpha$) by advancing the wire to the corner, rotating the wire by the angle ($\alpha$) and continuing advancing the wire in a new direction.

18. The method of claim 14, further comprising the steps of advancing the wire through a corner in the path having an interior angle by advancing the wire to the interior corner, rotating the wire by the angle and continuing advancing the wire in a new direction.

19. The method of claim 14, further comprising the steps of controlling varying electro-erosive current parameters, rinse parameters and pulse parameters.

20. The method of claim 19, further comprising the steps of reducing the current parameters to maintain a constant width of the cutting path.

21. The method of claim 20, further comprising the steps of controlling the reduction of the current with computerized control under consideration of stored geometric error values.

22. The method of claim 21, wherein the parameters for reducing the current in accordance with the radius of the curve being cut are obtained by calculating the geometric errors in the computer.

* * * * *